United States Patent Office 3,422,149
Patented Jan. 14, 1969

3,422,149
VINYL (TRIORGANO) PHOSPHONIUM HALIDES AND THE PREPARATION THEREOF
Michael M. Rauhut, Stamford, Conn., Grace B. Borowitz, Bethlehem, Pa., and Martin Grayson, Norwalk, Conn., assignors to American Cyanamid Company, Stamford, Conn., a corporation of Maine
No Drawing. Continuation-in-part of application Ser. No. 256,125, Feb. 4, 1963. This application Mar. 8, 1966, Ser. No. 532,582
U.S. Cl. 260—606.5    5 Claims
Int. Cl. C09k 3/28; C07f 9/02

This application is a continuation-in-part of U.S. application Ser. No. 256,125, filed Feb. 4, 1963 now abandoned.

The present invention relates to organophosphorus compounds. More particularly, the instant discovery concerns phosphonium salt derivatives of tertiary phosphines.

It has been found that tertiary phosphines generally will react with halo-substituted ethanol to produce the corresponding trialkyl-, tricycloalkyl-, or tri-aryl- 2-hydroxyethylphosphonium salts. In turn, these salts may be esterified using a lower alkanoic anhydride, lower alkanoic acid, or the like, to produce their corresponding trialkyl-, tricycloalkyl-, or triaryl- 2-acetoxyethylphosphonium salts.

The following equations illustrate this general reaction:

(A)

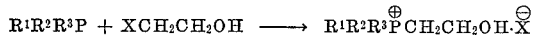

(B)

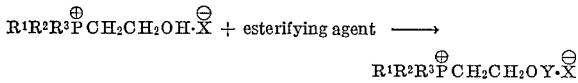

$R^1$, $R^2$, $R^3$ each representing, as will be seen hereinafter, alkyl, cycloalkyl and aryl, X representing halogen or tetraphenyl borate, and Y representing the residue of an esterifying agent such as an acylating agent. The following is a typical embodiment of generic Equations A and B, above:

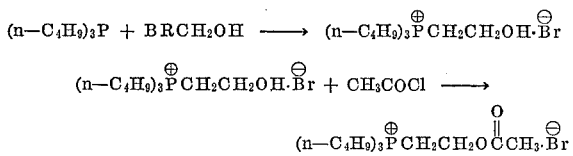

The trialkyl-, tricycloalkyl-, and triaryl-2-acetoxyethylphosphonium salts prepared as above may, in turn, be converted to their corresponding vinylphosphonium salts according to the following general equation:

(C)  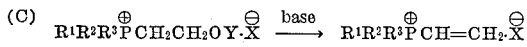

in which $R^1$, $R^2$, $R^3$, Y and X are the same as above.

The following is a typical embodiment of Equation C, above:

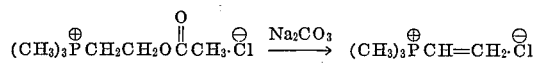

More specifically, in generic Equations A, B and C, above $R^1$, $R^2$ and $R^3$ each represent alkyl $C_1$–$C_{16}$, substituted alkyl $C_1$–$C_{16}$, cycloalkyl, particularly cyclolower-alkyl, aryl, and substituted aryl; X represents halogen, such as bromo, chloro and iodo, and tetraphenyl borate; and Y is Equations B and C represent the residue of an esterifying agent as shown in the specific embodiments, supra. The halide salts are preferred over the tetraphenyl borate salts since the former are more easily separated from the reaction mixtures than are the latter.

Typical tertiary phosphine reactants are the following: trimethylphosphine, triethylphosphine, tripropylphosphine, tributylphosphine, tripentylphosphine, trihexylphosphine, triheptylphosphine, trioctylphosphine, trinonylphosphine, tridecylphosphine, triundecylphosphine, tridodecylphosphine, tritridecylphosphine, tritetradecylphosphine, tripentadecylphosphine, trihexadecylphosphine, dodecyldiethylphosphine, dioctylpropylphosphine, diethylbutylphosphine, butylethylhexylphosphine, tri(2-methoxypentyl)phosphine, tris-2-cyanoethylphosphine, diethyl-2-ethoxyheptylphosphine, tricyclopropylphosphine, tricyclohexylphosphine, triphenylphosphine, diphenylnaphthylphosphine, trixylylphosphine, tritolylphosphine, tris(paraethoxyphenyl)phosphine, tris(para - chlorophenyl)phosphine, tris(2-chlorophenyl)phosphine, tris(3-bromophenyl)phosphine, and the like. As evident from this list, typical substituents for alkyl and aryl are alkoxy, particularly lower alkoxy, halogen, cyano, and aryl includes alkyl-substituted aryl, particularly lower-alkyl substituted phenyl. In the case of halogen-substituted alkyl, groups wherein the halogen is on a carbon atom alpha or beta to the phosphorus atom are not preferred since halogen so positioned tends to interact with phosphorus.

Typical esterifying agents follow: lower alkanoic anhydrides, such as acetic anhydride propionic anhydride, butanoic anhydride; lower alkanoic acids, such as formic acid, acetic acid, propionic acid, butanoic acid; acylating ($C_2$–$C_{18}$ alkanoyl) halides, such as acetyl chloride, propionyl bromide, butyryl iodide, octanoyl chloride, dodecanyl bromide, stearyl chloride, hexanoyl bromide; isopropenyl acetate; aryl sulfonyl halides, such as paratoluenesulfonyl chloride, phenyl sulfonyl bromide, 2,4-dimethylphenylsulfonyl chloride; alkyl (lower) chloroformates, such as ethylchloroformate, butylchloroformate; alkyl (lower) carbonates, such as diethylcarbonate, dipropylcarbonate, dibutylcarbonate; ketene; dimethyl sulfate; nitrosyl chloride; and trimethyl phosphate. From this list it will be apparent that the esterifying agent may be organic or inorganic and broadly includes agents which provide acyl groups, carbonate or bicarbonate groups, sulfato groups, nitroso groups, phosphato groups, sulfonyl groups, and the like.

In Equation C, above, typical suitable inorganic and inorganic bases are: alkali metal hydroxides, such as sodium hydroxide, potassium hydroxide, lithium hydroxide; alkali metal carbonates, such as sodium carbonates, potassium carbonate, lithium carbonate; alkaline earth metal hydroxides, such as magnesium hydroxide, barium hydroxide, calcium hydroxide; alkaline earth metal carbonates, such as magnesium carbonate, barium carbonate, calcium carbonate; activated alumina; and quaternary ammonium hydroxides, such as tetraalkyl (lower) ammonium hydroxides, including tetramethylammonium hydroxide, tetrapropylammonium hydroxide, and tetrabenzylammonium hydroxide; and basic ion exchange resins.[1] The term "base" is thus employed broad- ---
[1] Typical are: polymeric quarternary ammonium salts, e.g., polymeric trimethylbenzyl ammonium chloride, etc.

ly to mean an acid or proton acceptor since its function is to remove or catalyze the removal of the hydrogen ion formed during the reaction.

The reaction in Equation A hereinabove is carried out at a temperature in the range of 30° C. to 250° C., preferably 60° C. to 180° C. The Equation B reaction, above, is best carried out at a temperature in the range of 5° C. to 150° C. As to Equation C, above, this reaction is generally carried out at a temperature in the range of 20° C. to 180° C., preferably 50° C. to 150° C.

Each of these three reactions may be carried out at atmospheric, sub-atmospheric or super-atmospheric pressure; preferably, however, reaction is carried out at atmospheric pressure. By the same token, the ratio of the reactants in each of Equations A, B and C is not critical, an excess of either reactant, in each equation, with respect to the other being suitable. In Equation B, however, an excess of about 10% by weight of the acylating agent relative to the phosphonium salt reactant is preferred. Generally in Equations A and C stoichiometric amounts of the reactants are employed.

The reactions of Equation A, above, are best carried out in the presence of an inert organic solvent, i.e., a solvent which does not enter into or otherwise interfere with the reaction under the conditions contemplated herein. Typical solvents are dimethoxyethane, dioxane, ethylacetate, tetrahydrofuran, and the like.

The reactions of Equation B similarly are best carried out in the presence of an inert organic solvent of the type described for Equation A, as well as acetic acid, dimethylformamide, diglyme, and the like.

As to Equation C, typical suitable inert organic solvents in which the phosphonium salt is solvent, which solvents do not interfere or enter into reaction to any substantial degree, are dimethoxyethane, dioxane, dimethylformamide, diglyme, acetonitrile, ethylacetate, tetrahydrofuran, and other like linear and cyclic ethers, acetate esters (lower alkyl).

Alternatively, it has been found pursuant to the instant discovery that the products of Equation A, above, may be converted directly to the products of Equation C, thusly, D

in the presence of any base given above for Equation C and at a temperature in the range of 100° C. to 250° C. As in Equation C, a solvent of the type given hereinabove for Equation C is suitable and herein contemplated. If desired, the reaction may be carried out in the presence of a dehydrating agent, such as a siliceous agent including silica (e.g. silica gel), silica-alumina, and the like, in which other inert organic solvents are also suitable, e.g. aromatic hydrocarbons, such as toluene, benzene, xylene, cymene, and the like, methylene chloride, ethylene chloride, etc.

The products of Equations A, B, C and D above are useful as fire retardants in plastics, e.g., from 0.5 to 30 parts by weight of any one of above compounds when incorporated into 100 parts by weight of a thermoplastic polymer material, such as polyethylene, polypropylene, polystyrene, polyacrylate, polymethylmethacrylate, or the like, provides enhanced fire retardance to the polymer material upon exposure to an open flame. Moreover, the claimed compounds of the invention may be homopolymerized or copolymerized in known ways with one or a mixture of two or more different ethylenically unsaturated comonomers to high molecular weight products having uses similar to those of conventional vinyl polymers. Such uses include fibers, foils, filaments, adhesives, water-soluble films, coatings, utility as thickening agents, ion exchange resins, and the like. The polymers of the instant products are themselves an important discovery, as disclosed in copending U.S. patent application Ser. No. 298,551, filed July 30, 1963. The subject matter of said application is incorporated herein by reference.

Example I.—Tributyl-2-hydroxyethylphosphonium tetraphenylborate

Tributyl - 2 - hydroxyethylphosphonium bromide, obtained from combining tributylphosphine and 2-bromoethanol in 1,2-dimethoxyethane and refluxing under nitrogen, is dissolved in water and treated with excess 0.1 N sodium tetraphenylboron. The resulting precipitate is filtered recrystallized from ethanol to yield product tributyl-2-hydroxyethylphosphonium tetraphenylborate with melting point 124° C.–125° C.

Analysis of product.—Found: C, 80.03; H, 9.00; P, 5.35. $C_{38}H_{52}O$ requires: C, 80.55; H, 9.25; P, 5.47%.

As is evident from this example, the halide salts of Equation A may be converted, in situ or after recovery thereof, to the corresponding tetraphenylborate salts.

Example II.—Tributyl-2-acetoxyethylphosphonium bromide 1,2-dimethoxyethane (275 milliliters), freshly distilled from calcium hydride, 2-bromoethanol (133 grams, 1.06 moles), and tributylphosphine (204 grams, 1.01 moles) are combined under nitrogen and refluxed at 85° C. overnight with stirring. A heavy oil forms within an hour. Isopropenyl acetate (320 grams, 3.2 moles) and 48% HBr (3 drops) are slowly added to the reaction mixture which is then refluxed 18 hours. Volatile components are removed in vacuo at 70° C. Product (372.5 grams; 99.9% yield) remains as a thick hygroscopic oil, which could be forced to crystallize by stirring in a benzene-petroleum ether (boiling point 30° C.–60° C.) mixture. Crystalline tributyl-2-acetoxyethylphosphonium salt is obtained from part of the oily product by freeze drying a benzene solution of the oil.

Example III.—Tributyl-2-acetoxyethylphosphonium tetraphenylborate

Tributyl-2-acetoxyethylphosphonium bromide oil (16.2 grams produced as in Example II, above) is dissolved in water and treated with sodium tetraphenylboron (15 grams) dissolved in water. A white precipitate appears which is filtered and recrystallized from ethanol containing enough acetonitrile to cause solution at the boiling point of the mixture. Tributyl-2-acetoxy-ethylphosphonium tetraphenylborate (16.7 grams) is obtained with melting point of 177° C.–179° C.

Analysis of product.—Found: C, 76.65; H, 8.83; P, 5.24. $C_{40}H_{54}O_2BP$ requires: C, 7893; H, 8.94; P, 5.10%.

Tables A, B, C, and D, which follow, correspond to Equations A, B, C, and D, respectively. The examples in Tables A and B are carried out essentially as in Examples I and II, respectively, supra, excepting of course as shown in Tables A and B. The examples in Table C are carried out essentially as in Example LIX, infra, excepting of course as shown in Table C. Likewise, the products of Table D are recovered essentially as in Example LIX, infra.

While the foregoing examples specify certain details as to certain embodiments of the present invention, it is not intended that these details impose unnecessary limitations upon the scope of the instant discovery, except insofar as these limitations appear in the appended claims.

3,422,149

(A) $R^1R^2R^3 P + XCH_2CH_2OH \longrightarrow R^1R^2R^3 \overset{\oplus}{P}CH_2CH_2OH \cdot \overset{\ominus}{X}$

| Example No. | R¹ | R² | R³ | Moles R¹R²R³ P | X | Moles XCH₂CH₂OH | Solvent | Milliliters of Solvent | Temp., °C | Product |
|---|---|---|---|---|---|---|---|---|---|---|
| IV | CH₃ | CH₃ | CH₃ | 1 | Br | 1.0 | DME¹ | 1,500 | 70 | 2-hydroxyethyltrimethylphosphonium bromide. |
| V | n-C₄H₉ | n-C₄H₉ | n-C₄H₉ | 1 | Cl | 1.0 | DME | 1,500 | 83 | 2-hydroxyethyltributylphosphonium chloride. |
| VI | n-C₄H₉ | n-C₄H₉ | n-C₄H₉ | 1 | I | 1.2 | Dioxane | 1,200 | 101 | Do. |
| VII | n-C₄H₉ | n-C₄H₉ | n-C₄H₉ | 1 | Cl | 1.2 | do | 2,000 | 101 | 2-hydroxyethyltributylphosphonium iodide. |
| VIII | i-C₄H₉ | n-C₄H₉ | i-C₄H₉ | 1 | Cl | 0.9 | Ethyl acetate | 1,800 | 50 | 2-hydroxyethyltriisobutylphosphonium chloride. |
| IX | n-C₈H₁₇ | n-C₈H₁₇ | n-C₈H₁₇ | 1 | Cl | 1.1 | DME | 1,700 | 83 | 2-hydroxyethyltrioctylphosphonium chloride. |
| X | n-C₁₂H₂₅ | n-C₁₂H₂₅ | n-C₁₂H₂₅ | 1 | Cl | 1.1 | DME | 1,700 | 83 | 2-hydroxyethyltridodecylphosphonium chloride. |
| XI | C₁₆H₃₃ | C₁₆H₃₃ | C₁₆H₃₃ | 1 | Cl | 1.3 | THF² | 1,600 | 30 | 2-hydroxyethyltrihexadecylphosphonium chloride. |
| XII | C₂H₅ | C₂H₅ | C₂H₅ | 1 | Cl | 1.1 | Dioxane | 1,700 | 200 | 2-hydroxyethyltriethylphosphonium chloride. |
| XIII | C₄H₉ | C₂H₅ | C₂H₅ | 1 | Cl | 1.1 | Ethyl acetate | 2,000 | 45 | 2-hydroxyethylbutyldiethylphosphonium chloride. |
| XIV | C₂H₅ | C₂H₅ | C₂H₅O—CH₂—CH₂ | 1 | Cl | 1.2 | Dioxane | 1,800 | 75 | 2-hydroxyethyldiethyl-2-ethoxyethylphosphonium chloride. |
| XV |  |  |  | 1 | Br | 1.3 | DME | 1,600 | 60 | 2-hydroxyethyltricyclohexylphosphonium bromide. |
| XVI | 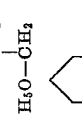 |  | 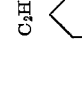 | 1 | Cl | 0.9 | DME | 2,000 | 80 | 2-hydroxyethyltricyclopentylphosphonium chloride. |
| XVII | 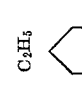 |  | 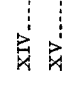 | 1 | I | 1.1 | Dioxane | 1,500 | 90 | 2-hydroxyethyldiphenylnaphthylphosphonium iodide. |
| XVIII |  | | | 1 | I | 1.0 | do | 2,000 | 101 | 2-hydroxyethyltriphenylphosphonium iodide. |
| XIX | | | | 1 | Cl | 1.2 | Ethyl acetate | 1,600 | 65 | 2-hydroxyethyltri(para-chloro-phenyl)phosphonium chloride. |
| XX | | | | 1 | Cl | 1.3 | DME | 1,700 | 83 | 2-hydroxyethyltri(para-tolyl)phosphonium chloride. |

¹ DME = Dimethoxyethane.   ² THF = Tetrahydrofuran.

TABLE B $$(B)\ R^1 R^2 R^3 \overset{\oplus}{P}CH_2 CH_2 OH \cdot \overset{\ominus}{X} + A \longrightarrow R^1 R^2 R^3 \overset{\oplus}{P}CH_2 CH_2 OY \cdot \overset{\ominus}{X}$$

| Example No. | Product of Example No. | Moles $R_3\overset{\oplus}{P}CH_2CH_2OH\cdot\overset{\ominus}{X}$ | A | Moles A | Solvent Milliliters (ml.) | Temp., °C. | Product |
|---|---|---|---|---|---|---|---|
| XXI | IV | 1.0 | Isopropenyl acetate | 3.2 | DME; 300 ml | 83 | 2-acetoxyethyltrimethyl phosphonium bromide. |
| XXII | V | 1.0 | Dimethyl sulfate | 3.8 | Dioxane; 300 ml | 90 | 2-methylsulfatoethyltributyl phosphonium chloride. |
| XXIII | VI | 0.8 | Acetic anhydride | 1.0 | Acetic acid; 300 ml | 120 | 2-acetoxyethyltributyl phosphonium chloride. |
| XXIV | VII | 0.9 | Nitrosyl chloride | 1.1 | Diglyme | 120 | 2-nitroethyltributyl phosphonium iodide. |
| XXV | VIII | 1.0 | Acetyl chloride | 1.2 | DME; 500 ml | 30 | 2-acetoxyethyltriisobutyl phosphonium chloride. |
| XXVI | X | 1.0 | p-Toluenesulfonyl chloride | 1.0 | DME; 200 ml | 60 | 2-(p-toluenesulfonyloxy)-ethyl tridodecyl phosphonium chloride. |
| XXVII | XII | 1.0 | Trimethyl phosphate | 1.1 | Acetic acid; 500 ml | 80 | 2-dimethylphosphatoethyltriethyl phosphonium chloride. |
| XXVIII | XI | 1.0 | Propionic acid | 2.4 | DMF;¹ 300 ml | 10 | 2-propionyloxyethyl-trihexadecylphosphonium chloride. |
| XXIX | XIII | 1.0 | Butanoic anhydride | 1.0 | DMF; 1,000 ml | 30 | 2-butyryloxyethyl-butylethylhexylphosphonium chloride. |
| XXX | XIV | 0.8 | Acetic acid | 4.0 | None | 118 | 2-acetoxyethyldiethyl-2-ethoxyethylphosphonium chloride. |
| XXXI | XV | 0.9 | Acetyl chloride | 1.0 | DME; 200 ml | 65 | 2-acetoxyethyltricyclohexylphosphonium bromide. |
| XXXII | XVI | 1.0 | Hexanoyl chloride | 1.9 | Dioxane; 150 ml | 25 | 2-hexanoyloxyethyl-tricyclopentylphosphonium chloride. |
| XXXIII | XVIII | 1.0 | Acetic anhydride | 6.0 | None | 100 | 2-acetoxyethyltriphenylphosphonium iodide. |
| XXXIV | XVII | 1.1 | Stearyl chloride | 3.3 | DME; 700 ml | 50 | 2-stearyloxyethyldiphenylnaphthylphosphonium iodide. |
| XXXV | XIX | 1.0 | Dodecanoyl bromide | 4.0 | DMF; 1,000 ml | 40 | 2-dodecanoyloxyethyltri(para-chlorophenyl)-phosphonium chloride. |
| XXXVI | XX | 1.0 | Phenylsulfonyl bromide | 1.0 | Dioxane; 600 ml | 65 | 2-(phenylsulfonyloxy)ethyltri-(para-tolyl)phosphonium chloride. |
| XXXVII | IV | 1.0 | Ethylchloroformate | 2.0 | Diglyme; 300 ml | 40 | 2-(ethoxycarbonyloxy)ethyltrimethyl phosphonium bromide. |
| XXXVIII | VI | 0.9 | Dipropyl carbonate | 3.0 | DME; 250 ml | 100 | 2-(propoxycarbonyloxy)ethyltributylphosphonium chloride. |
| XXXIX | VI | 1.0 | Ketene | 1.0 | THF; 500 ml | 75 | 2-acetoxyethyltributyl phosphonium chloride. |

¹ DMF=Dimethylformamide.

TABLE C $$(C)\ R^1R^2R^3\overset{\oplus}{P}CH_2CH_2OY\cdot\overset{\ominus}{X} + Base \longrightarrow R^1R^2R^3\overset{\oplus}{P}CH=CH_2\overset{\ominus}{X}$$

| Example No. | Product of Example No. | Moles of $R^1R^2R^3\overset{\oplus}{P}CH_2CH_2OY\cdot\overset{\ominus}{X}$ | Base | Moles of Base | Solvent¹ Milliliters (ml.) | Temp., °C. | Product |
|---|---|---|---|---|---|---|---|
| XL | XXXI | 1.0 | K₂CO₃ | 1.0 | DME; 300 ml | 83 | Vinyltrimethylphosphonium bromide. |
| XLI | XXXII | 1.0 | Na₂CO₃ | 2.0 | Dioxane; 300 ml | 100 | Vinyltributylphosphonium chloride. |
| XLII | XXXIII | 1.0 | Li₂CO₃ | 4.0 | Ethyl acetate; 500 ml | 80 | Do. |
| XLIII | XXXIV | 2.0 | Mg(CO₃) | 8.0 | Diglyme | 100 | Vinyltributylphosphonium iodide. |
| XLIV | XXXV | 0.5 | Ba(OH)₂ | 1.0 | Acetonitrile; 500 ml | 80 | Vinyltriisobutylphosphonium chloride. |
| XLV | XXXVI | 0.9 | Ca(OH)₂ | 1.1 | THF; 500 ml | 60 | Vinyltridodecylphosphonium chloride. |
| XLVI | XXXVII | 1.0 | Polymeric trimethylbenzyl ammonium chloride | 4.0 | DME; 400 ml | 85 | Vinyltriethylphosphonium chloride. |
| XLVII | XXXVIII | 1.0 | KOH | 1.0 | THF | 150 | Vinyltrihexadecylphosphonium chloride. |
| XLVIII | XXXIX | 1.0 | NaOH | 1.0 | Acetonitrile | 20 | Vinylbutyldiethylhexylphosphonium chloride. |
| XLIX | XXX | 1.0 | LiOH | 3.0 | do | 60 | Vinyldiethyl-2-ethoxyethylphosphonium chloride. |
| L | XXXI | 1.0 | Mg(OH)₂ | 1.0 | THF | 180 | Vinyltricyclohexylphosphonium bromide. |
| LI | XXXII | 1.0 | Ca(CO₃) | 1.0 | Dioxane | 72 | Vinyltricyclopentylphosphonium chloride. |
| LII | XXXIII | 0.5 | Ba(CO₃) | 1.0 | DME | 81 | Vinyltricyclohexylphosphonium iodide. |
| LIII | XXXIV | 3.0 | do | 1.0 | Dioxane | 97 | Vinyltriphenylphosphonium chloride. |
| LIV | XXXV | 1.0 | Activated alumina | 5.0 | DME | 50 | Vinyltri(para-chloro-phenyl)phosphonium chloride. |
| LV | XXXVI | 1.0 | Tetramethyl-ammonium hydroxide | 1.0 | THF | 35 | Vinyldiphenylnaphthylphosphonium chloride. |
| LVI | XXXVII | 1.0 | Tetrapropyl-ammonium hydroxide | 1.7 | Diglyme | 42 | Vinyltri(para-tolyl)phosphonium chloride. |
| LVII | XXXVIII | 2.0 | Polymeric triethylbenzyl ammonium hydroxide | 1.0 | DMF | 37 | Vinyltrimethylphosphonium bromide. |
| LVIII | XXXIX | 1.0 | Tetrabenzyl-ammonium hydroxide | 1.0 | DME | 25 | Do. |

¹ When not specified the amount of solvent employed is 500 milliliters.

TABLE D $$(D)\ R^1R^2R^3\overset{\oplus}{P}CH_2CH_2OH\cdot\overset{\ominus}{X} \xrightarrow[100°\,C.-250°\,C.]{base} R^1R^2R^3\overset{\oplus}{P}CH=CH_2\overset{\ominus}{X}$$

| Example No. | Product of Example No. | Base | Temp., °C. | Dehydrating Agent | 500 Milliliters of Solvent | Product |
|---|---|---|---|---|---|---|
| LIX | V | Na₂CO₃ | 120 | Silica gel¹ | DME | Vinyltributylphosphonium chloride. |
| LX | X | Ca(OH)₂ | 100 | Silica-alumina² | DME | Vinyltridodecylphosphonium chloride. |
| LXI | XI | LiOH | 220 | | THF | Vinyltrihexadecylphosphonium chloride. |
| LXII | XIV | Mg(OH)₂ | 180 | Silica-alumina² | Dioxane | Vinyldiethyl-2-ethoxyethylphosphonium chloride. |
| LXIII | XVII | Na₂CO₃ | 150 | Silica gel | Dioxane | Vinyltricyclohexylphosphonium bromide. |
| LXIV | XVIII | Ba₂CO₃ | 250 | | do | Vinyldiphenylinaphthylphosphonium iodide. |
| LXV | XIX | Na₂CO₃ | 205 | | DMF | Vinyltriphenyl(para-chlorophenyl)-phosphonium chloride. |
| LXVII | XX | Activated alumina | 175 | | DME | Vinyltri(para-tolyl)phosphonium chloride. |

¹ Finely-divided particulates.  ² Finely-divided particulates.

By finely-divided particulates in Table D is intended 28 to 200 mesh. Larger or smaller particulates are likewise within the purview of the instant discovery.

Example LXVIII.—Tributylvinylphosphonium bromide

Tributyl-2-acetoxyethylphosphonium bromide (23.7 millimoles) is dissolved in 1,2-dimethoxyethane (25 milliliters) and sodium carbonate (5.0 grams, 47 millimoles) is added. The mixture is stirred at reflux under nitrogen for 8 hours. The solid is filtered off and washed with hot 1,2-dimethoxyethane. The combined filtrates are evaporated to leave a semi-solid residue. Recrystallization from ethyl acetate yields product tributylvinylphosphonium bromide (3.3 grams, 10.7 millimoles, 45% yield with melting point 148° C.–150° C.) Further recrystallization from ethylacetate-acetonitrile raises the melting point to 151.5° C. to 152.5° C.

The following demonstrates the unobvious character of the claimed products of the instant invention.

Into a suitable reaction vessel is charged a 30% aqueous solution containing 22.5 parts of tributylvinylphosphonium bromide and 75 parts of distilled water. Nitrogen gas is bubbled through the solution for 15 minutes after which the vessel is sealed air tight. The deaerated solution is then contacted with X-rays (250 kilovolt peak X-rays at 30 milliamps) and irradiated at ambient temperatures for 4.5 hours at a distance of 10 centimeters. The calculated dose to which the solution is subjected is 1.9 mrad. After a 3 week dialysis period, 21.5 parts (95%) of homopolymeric tributylvinylphosphonium bromide is recovered.

Ten parts of this polymer are then further purified by adding 500 parts of methyl ethyl ketone. A gummy solid separates and the methyl ethyl ketone is decanted off. The gummy solid is then triturated with a 50/50 mixture of methyl ethyl ketone and diethyl ether. The solid is then rinsed twice with more ether and a white, somewhat tacky, solid is recovered. The solid is dried for two hours at 50° C. in a vacuum oven, dissolved in water and freeze dried. The resultant product is a fluffy, white solid which is slightly hygroscopic. The yield is 60%. The intrinsic viscosity of the polymer in methanol, which is 0.3 M in sodium formate, is 0.77. The molecular weight of the polymer, by light scattering method in methanol, 0.3 M in sodium formate, is 600,000.

*Analysis.*—Theory: C, 54.50; H, 9.70; P, 10.00; Br, 25.90. Found: C, 52.72; H, 9.32; P, 9.52; Br, 26.06.

Following the above procedure, except for substitution, in separate experiments, of equivalent amounts of tricyclohexylvinylphosphonium bromide, triethylvinylphosphonium bromide, and dimethylphenylvinylphosphonium bromide for the tributylvinylphosphonium bromide, no polymer is recovered.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A method of preparing a vinylphosphonium salt of the formula

which comprises reactively contacting with a base a phosphonium salt of the formula

wherein, the above formulas, $R^1$, $R^2$ and $R^3$ are each alkyl ($C_1$–$C_{26}$), substituted alkyl ($C_1$–$C_{16}$), cycloalkyl, aryl, or substituted aryl, said substituents for alkyl and aryl being alkoxy, halogen, or cyano, X is halogen or tetraphenyl borate, and Y is the residue of an esterifying agent.

2. The method of claim 1 wherein the reactant is 2-acetoxyethyltributylphosphonium chloride and the product vinylphosphonium salt is vinyltributylphosphonium chloride.

3. A method of preparing a vinylphosphonium salt of the formula

which comprises heating at from about 100° C. to 250° C. in the presence of a base a 2-hydroxyethylphosphonium salt of the formula

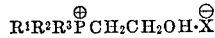

wherein $R^1$, $R^2$, and $R^3$ in the above formulae are each alkyl ($C_1$–$C_{16}$), substituted alkyl ($C_1$–$C_{16}$), cycloalkyl, aryl, or substituted aryl, said substituents for alkyl and aryl being alkoxy, halogen, or cyano; and wherein X is halogen or tetraphenyl borate.

4. A compound of the formula

wherein $R^1$, $R^2$, and $R^3$ in the above formula are each alkyl ($C_4$–$C_{16}$), substituted alkyl ($C_4$–$C_{16}$), cycloalkyl, aryl or substituted aryl, said substituents for alkyl and aryl being alkoxy, halogen, or cyano; and wherein X is halogen or tetraphenyl borate.

5. The compound of claim 4 wherein $R^1$, $R^2$, and $R^3$ are each butyl and X is halogen.

References Cited

Laible, R. C., Chemical Abstracts, 53, 1959, p. 19975h, QD1.A51.

Marsi, Kenneth L., Chemical Abstracts, 55, 1961, p. 23400c, QD1.A51.

Rabinowitz et al., J. of Organic Chem., 26, 1961, p. 4623, QD241J6.

TOBIAS E. LEVOW, *Primary Examiner.*

W. F. W. BELLAMY, *Assistant Examiner.*

U.S. Cl. X.R.

252—8.1